E. T. BETKER.
ALTERNATE ROTARY DRIVING MECHANISM.
APPLICATION FILED APR. 17, 1915.
1,172,004.
Patented Feb. 15, 1916.
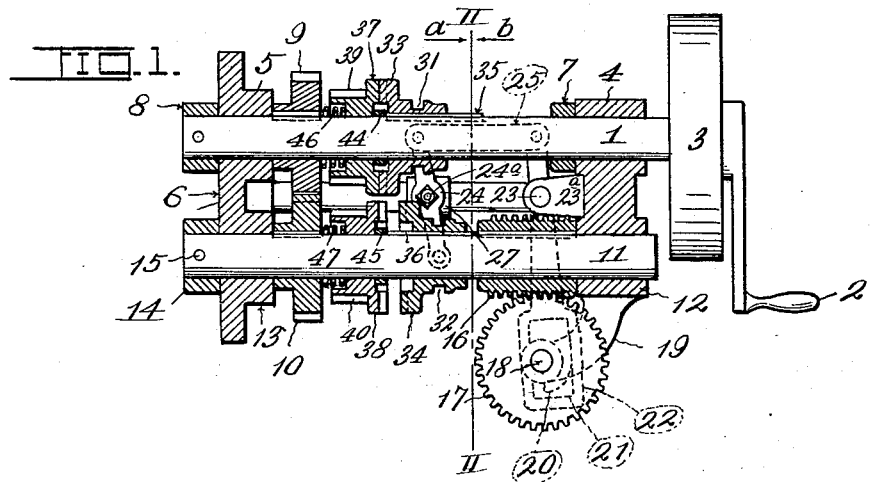
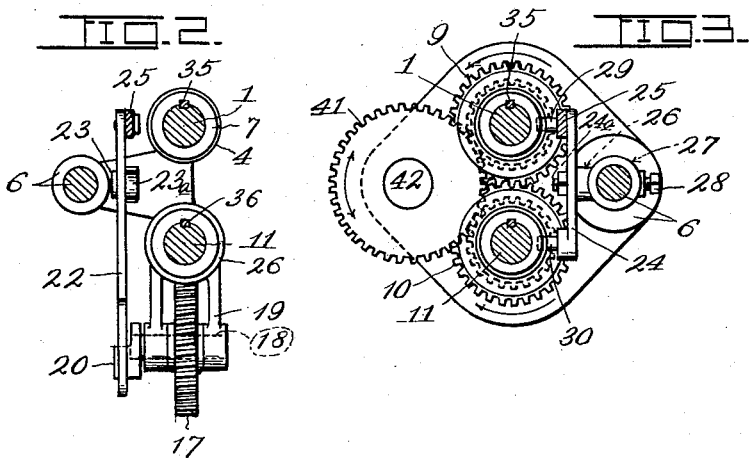
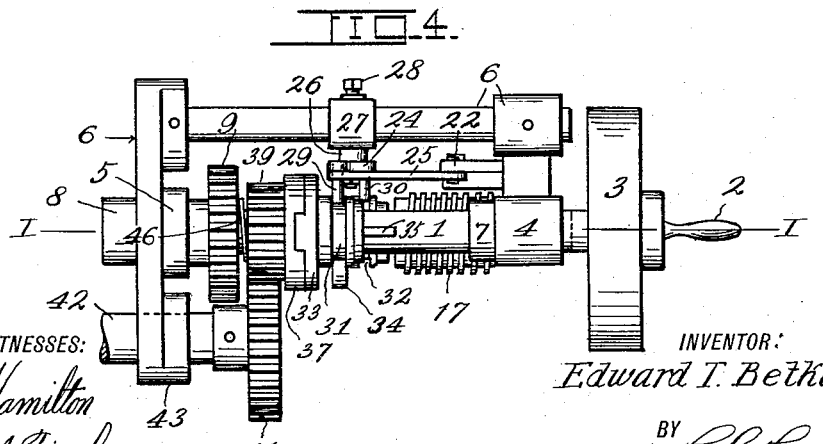
WITNESSES:
R. E. Hamilton
L. J. Fischer
INVENTOR:
Edward T. Betker,
BY
F. G. Fischer
ATTORNEY.

UNITED STATES PATENT OFFICE.

EDWARD T. BETKER, OF KANSAS CITY, MISSOURI.

ALTERNATE ROTARY DRIVING MECHANISM.

1,172,004.  Specification of Letters Patent.  Patented Feb. 15, 1916.

Application filed April 17, 1915. Serial No. 22,066.

*To all whom it may concern:*

Be it known that I, EDWARD T. BETKER, a citizen of the United States, residing at Kansas City, in the county of Jackson and State of Missouri, have invented certain new and useful Improvements in Alternate Rotary Driving Mechanism, of which the following is a specification.

My invention relates to new and useful improvements in driving mechanism for imparting alternate rotary motion to any machine to which my mechanism may be applied, and while my invention is capable of more or less general use, it is particularly useful in driving cleaning and extracting machines.

One important feature resides in the shifting mechanism which controls the alternating rotary motion, said shifting mechanism being positively driven so that there will be no perceptible pause or stop during the reversing operation, such as occurs in that type of mechanism in which the reversing operation is dependent more or less on momentum and friction.

Other features of the invention will hereinafter appear, and in order that said invention may be fully understood, reference will now be made to the accompanying drawing, in which:

Figure 1 is a vertical longitudinal sectional view of my driving gear on line I—I of Fig. 4. Fig. 2 is a vertical cross sectional view, with some of the parts removed, on line II—II of Fig. 1 and looking in the direction of arrow *a*. Fig. 3 is a section on line II—II of Fig. 1, looking in the direction of *b*. Fig. 4 is a plan view of the driving gear.

In carrying out the invention, I employ a main shaft 1, which is constantly driven in one direction either by hand or power as desired, a handle 2 being used when the mechanism is to be driven by hand, and a pulley 3 being used when the mechanism is to be power driven. Shaft 1 is journaled in bearings 4 and 5 of a frame 6, and is held from lateral movement by collars 7 and 8 and a cog wheel 9. The collars 7 and 8 abut the bearings 4 and 5 and the cog wheel 9 is keyed or otherwise rigidly mounted upon the shaft 1 and abuts the opposite side of the bearing 5 from that engaged by the collar 8. The cog wheel 9 intermeshes with a similar cog wheel 10, rigidly mounted upon a counter shaft 11, journaled in bearings 12 and 13 of the frame 6. The counter shaft 11 is held from longitudinal movement by the cog wheel 10 abutting one side of the bearing 13 and a collar 14 engaging the opposite side of the bearing 13, said collar 14 being fixedly-mounted upon the counter shaft 11 by any suitable means, such as a pin 15.

16 designates a worm fixedly-mounted upon the counter shaft 11 to drive a worm wheel 17, fixedly-mounted upon a transverse shaft 18, journaled in a bearing 19 depending from the bearing 12. The transverse shaft 18 carries a fixedly-mounted cam 20, operating in the slotted portion 21 of a rock lever 22, fulcrumed at 23 and connected to a shifting lever 24 through the intermediacy of a link 25. The shifting lever 24 is fulcrumed about midway between its ends upon a stud bolt 24$^a$, projecting from a lug 26 on one side of a sleeve 27, secured to the frame 6 by any suitable means, such as a set screw 28. The shifting lever 24 is provided at its ends with laterally projecting studs 29 and 30, which project into the peripheral grooves 31 and 32 of clutch members 33 and 34, slidably mounted upon shafts 1 and 11, but made to rotate therewith through the intermediacy of feathers 35 and 36, respectively. The clutch members 33 and 34 are adapted to drive companion clutch members 37 and 38, loosely-mounted upon the shafts 1 and 11 and provided with small integral cog wheels 39 and 40, respectively, which are in constant engagement with a large cog wheel 41, mounted upon a power transmission shaft 42, journaled in a bearing 43, on the frame 6. The clutch members 37 and 38 are yieldingly-held against collars 44 and 45 fixed to the shafts 1 and 11, by coil springs 46 and 47 interposed between said clutch members 37 and 38 and the adjacent cog wheels 9 and 10, respectively. The shaft 42 may be connected to the gearing of a cleaning and extracting machine or any other mechanism to which it is desired to impart an alternating rotary motion.

In practice the shaft 1 is constantly driven in one direction and in turn constantly drives the shaft 11 in an opposite direction through the intermediacy of the cog wheels 9 and 10. As the shaft 11 rotates it rocks the lever 22 at intervals through the intermediacy of the worm 16, the worm wheel 17, and the cam 20 which is slowly driven by the worm wheel 17 and alternately engages the opposite sides of the slotted portion 21 of the rock lever 22, thereby rocking said lever in alternate directions. The lever 22 in turn alternately throws the clutch members 33 and 34 into engagement with the respective companion clutch members 37 and 38, and thus imparts alternating rotary motion to the transmission shaft 42 through the intermediacy of the cog wheels 39, 40 and 41. By yieldingly mounting the clutch members 37 and 38 all danger of breaking their teeth is avoided, because when their respective clutch members 33 and 34 are forced forward into engagement thereby by the shifting lever 24, the springs 46 and 47 yield until the clutch teeth reach the engaging positions, when the clutch members 37 and 38 are immediately forced into engaging positions by said springs 46 and 47.

From the foregoing description it is apparent that I have produced an alternating rotary driving mechanism which is positive and reliable in its action, and while I have shown and described the preferred form of my invention, I reserve the right to make such changes in the construction, combination, and arrangement of parts as properly fall within the spirit and scope of the claims.

Having thus described my invention, what I claim and desire to secure by Letters Patent, is:

1. In a mechanism of the character described, a main shaft constantly driven in one direction, a counter shaft constantly driven in a reverse direction by said main shaft, a transmission shaft driven in alternate directions by the main shaft and said counter shaft, and positively driven shifting mechanism to control the direction of travel of said transmission shaft.

2. In a mechanism of the character described, a main shaft constantly driven in one direction, a counter shaft constantly driven in a reverse direction by said main shaft, a transmission shaft geared to the main and counter shafts, clutches on the main and counter shafts to effect driving of the transmission shaft in alternate directions, and positively driven means to alternately shift said clutches in and out of gear.

3. In a mechanism of the character described, a main shaft constantly driven in one direction, a counter shaft driven in a reverse direction by said main shaft, a transmission shaft geared to the main and counter shafts, clutches on the main and counter shafts to effect driving of the transmission shaft in alternate directions, a shifting lever to alternately shift said clutches in and out of gear, and positively driven means for actuating said shifting lever.

4. In a mechanism of the character described, a main shaft constantly driven in one direction, a counter shaft driven in a reverse direction by said main shaft, a transmission shaft geared to the main and counter shafts, clutches on the main and counter shafts to effect driving of the transmission shaft in alternate directions, a shifting lever to alternately shift said clutches in and out of gear, a rock-lever operably-connected to said shifting lever to actuate the same, and positively driven means for actuating said rock lever.

5. In a mechanism of the character described, a main shaft constantly driven in one direction, a counter shaft constantly driven in a reverse direction by said main shaft, a transmission shaft geared to the main and counter shafts, clutches on the main and counter shafts to effect driving of the transmission shaft in alternate directions, shifting means to alternately shift said clutches in and out of gear, and positively driven worm gearing to operate said shifting means.

6. In a mechanism of the character described, a main shaft constantly driven in one direction, a counter shaft constantly driven in a reverse direction by said main shaft, a transmission shaft geared to the main and counter shafts, clutches on the main and counter shafts to effect driving of the transmission shaft in alternate directions, a rock-lever to alternately shift said clutches in and out of gear, a cam for actuating said rock lever, and gearing to drive said cam at a lower speed than the main and counter shafts.

7. In a mechanism of the character described, a main shaft constantly driven in one direction, a counter shaft constantly driven in a reverse direction by said main shaft, a transmission shaft geared to the main and counter shafts, sliding clutch members on the main and counter shafts, companion clutch members yieldingly mounted on the main and counter shafts and adapted to coact with the sliding clutch members, and positively driven means to alternately shift the sliding clutch members in and out of gear with their respective yieldingly mounted companion clutch members.

8. In a mechanism of the character described, a main shaft constantly driven in one direction, a counter shaft constantly driven in a reverse direction to said main shaft, intermeshing gear wheels fixed upon the main and counter shafts to drive the latter, a transmission shaft, a gear wheel fixedly mounted thereon, gear wheels loosely mounted upon the main and counter shafts and intermeshing with the gear wheel on the transmission shaft to alternately drive the same in reverse directions, and positively driven means to alternately lock the loose gear wheels upon the main and counter shafts.

In testimony whereof I affix my signature, in the presence of two witnesses.

EDWARD T. BETKER.

Witnesses:
FRED G. FISCHER,
L. J. FISCHER.